US011993071B2

(12) United States Patent
D'Annunzio et al.

(10) Patent No.: US 11,993,071 B2
(45) Date of Patent: May 28, 2024

(54) INK DISPENSING SYSTEM USING PRESSURE

(71) Applicant: BOBST FIRENZE S.R.L., Campi Bisenzio (IT)

(72) Inventors: Federico D'Annunzio, Florence (IT); Antonio Bellosi, Florence (IT); Andrea Melchiorri, Ferrara (IT)

(73) Assignee: BOBST FIRENZE S.R.L., Campi Bisenzio (IT)

( * ) Notice: Subject to any disclaimer, the term of this patent is extended or adjusted under 35 U.S.C. 154(b) by 0 days.

(21) Appl. No.: 17/415,629

(22) PCT Filed: Dec. 18, 2019

(86) PCT No.: PCT/EP2019/025460
§ 371 (c)(1),
(2) Date: Jun. 17, 2021

(87) PCT Pub. No.: WO2020/126084
PCT Pub. Date: Jun. 25, 2020

(65) Prior Publication Data

US 2022/0080721 A1 Mar. 17, 2022

Related U.S. Application Data

(63) Continuation of application No. PCT/IB2019/052602, filed on Mar. 29, 2019.

(30) Foreign Application Priority Data

Dec. 20, 2018 (EP) ..................................... 18020647

(51) Int. Cl.
*B41F 31/08* (2006.01)
*B41F 31/02* (2006.01)
*B41F 33/00* (2006.01)

(52) U.S. Cl.
CPC ............ *B41F 31/08* (2013.01); *B41F 31/022* (2013.01); *B41F 33/0045* (2013.01); *B41P 2251/10* (2013.01)

(58) Field of Classification Search
CPC .... B41F 31/08; B41F 31/022; B41F 33/0045; B41F 31/02; B41F 31/025; B41P 2251/10
See application file for complete search history.

(56) References Cited

U.S. PATENT DOCUMENTS 8,708,439 B2 * 4/2014 Ihme ........................ B01F 33/84 347/19
2001/0011512 A1 * 8/2001 Koehler ................ B41F 31/022 101/365
2016/0096360 A1 * 4/2016 Zetzl ..................... B41F 31/022 101/364

FOREIGN PATENT DOCUMENTS

CN 101939167 A 1/2011
CN 103358681 A 10/2013
(Continued)

OTHER PUBLICATIONS

International Search Report and Written Opinion issued on Apr. 3, 2020 in International Patent Application No. PCT/EP2019/025460 (10 pages, in English).
(Continued)

*Primary Examiner* — Matthew G Marini
*Assistant Examiner* — Leo T Hinze
(74) *Attorney, Agent, or Firm* — Bookoff McAndrews, PLLC

(57) ABSTRACT

This document discloses a system to dispense a precise and continuous amount of ink for a large printing press. The dispensing system can be judiciously combined into a more elaborate dispensing system that uses two chambers with ink having a different density to dispense ink with a precise, adjustable and stable ink density. The dispensing system can
(Continued)

be used to compensate the drifts in quality observed in presses when the speed, or any environmentable parameters vary.

20 Claims, 5 Drawing Sheets

(56) References Cited

FOREIGN PATENT DOCUMENTS

| | | | |
|---|---|---|---|
| CN | 103448363 | A | 12/2013 |
| CN | 107531056 | A | 1/2018 |
| EP | 1362701 | A1 | 11/2003 |
| WO | 0068018 | A1 | 11/2000 |
| WO | 2009071133 | A1 | 6/2009 |
| WO | 2013159777 | A1 | 10/2013 |
| WO | 2017174219 | A1 | 10/2017 |

OTHER PUBLICATIONS

Cheng Guangyao et al., "Three-dimensional surface color spray painting technology", pp. 9-13, Cultural Development Press, published Jul. 31, 2018.

Chinese Search Report in corresponding Chinese Application No. 2019800916822, dated Feb. 17, 2023.

* cited by examiner

INK DISPENSING SYSTEM USING PRESSURE

CROSS-REFERENCE TO RELATED APPLICATION(S)

This application is a National Stage under 35 U.S.C. § 371 of International Application No. PCT/EP2019/025460, filed Dec. 18, 2019, which claims priority to International Application No. PCT/162019/052602, filed on Mar. 29, 2019, and European Patent Application No. 18020647.6, filed on Dec. 20, 2018, the contents of all of which are incorporated by reference in their entirety.

FIELD OF THE INVENTION

This invention relates to an inking system for a printing machine. In particular, it relates to a system for delivering precise amounts of ink to the printing machine.

TECHNICAL BACKGROUND

A printing machine is composed of several printing units; each printing unit is printing one colour on a substrate. The combination of colours results in the coloured printed pattern. Modern machines offer an inline quality control system that verifies the quality of the printed material and feeds back the result to the printing units. The quality control may take place at the end of the printing process, or after each unit. In this context of quality control, the reaction time between the detection of a quality issue and its resolution is important. A printing unit may solve a quality issue by modifying a printing parameter, like for example, the printing pressure, the ink temperature, the ink composition, the pattern alignment, etc. To be reactive on parameters involving ink composition or ink temperature, modern printing units tend to minimise the amount of ink used in the ink buffer in direct contact with the printing apparatus. The ink buffer may be, for example, an ink pan, a reservoir with a double doctor blade or an inking nip between the printing and the inking cylinder. To handle a small inking buffer or to regulate an ink mixture a precise inking dispensing system is needed.

SUMMARY OF THE INVENTION

The current invention discloses an ink dispensing system that uses air pressure to control the dispensing of ink. The dispensing system comprises a first chamber for holding ink under pressure. A pressure source delivers air to the chamber to adjust the pressure in the chamber. A first ink channel connects the output of the chamber to an output of the ink dispensing system. The pressure in the chamber is used as a parameter to control the flow (or equivalently the amount) of ink coming out of the chamber and out of the dispensing system. A control system monitors the flow of ink dispensed by the system to regulate the pressure delivered to the chamber, thereby adjusting the flow of ink.

The sensor may be a flow sensor and/or a sensor that measures a level (and thereby—optionally—a volume of ink by knowing the container shape and size). When using a flow sensor, the sensor is placed on the ink channel. Flow is the most convenient (direct/fast reacting) value to regulate, and thus the flow sensor is the preferred solution. When using a level sensor, it may be placed inside the chamber or after the system output (to measure the level of ink delivered). The volume/amount of ink (delivered at the output or remaining in the chamber) is obtained using the level sensor or can be computed by integrating over time the readings of a flow sensor. The flow of ink is obtained by using the flow sensor or can be computed by deriving over time the readings of a level sensor.

Controlling the flow of ink using pressure allows for very precise control of the flow. By regulating the flow, the system continuously dispenses ink, even if it can stop and restart the flow. Using pressure also allows for very precise control of the level of ink (in the inking buffer), since the level is the result of the accumulation of a flow of ink.

Advantageously, to regulate the composition of the ink at the output, the system comprises a second chamber to hold ink under pressure. The composition of ink in the second chamber is meant to be different from the one in the first chamber. Ink coming out of the second chamber is transported via a second ink channel. The second ink channel flows into the first ink channel at a junction point. The resulting ink mixture is processed with a mixer to obtain a homogeneous mixture. Additionally, the dispensing unit either comprises a second pressure source (which is part of the second ink channel) or comprises a mixing valve at the junction to control the relative amount of ink mixed from each channel. As a result, the dispensing system can control the total flow of ink at the output of the dispensing system, as well as the relative flow of ink stemming from the first and second chamber respectively thereby controlling the ink composition.

In the configuration using the second pressure source, the second pressure source delivers air to the second chamber to adjust the chamber pressure. The system further comprises a second sensor to measure the flow of ink coming out of the second chamber (before the junction point with the first channel). Preferably, the first sensor is configured to measure the flow of ink stemming from the first chamber (in other words, it is preferably placed on the first ink channel before the mixing point).

In the configuration using the mixing valve, the first pressure source may be connected to the first and the second chamber.

The pressure source used here are configured to set a controllable pressure value. In other words, the pressure at the output of the pressure source may be set to (virtually) any value between two pressure boundaries.

Advantageously, to refill the chamber(s), an ink reservoir may be attached to each chamber. The ink reservoir, thanks to a pump, can refill the chamber with ink without having to depressurise the chamber, and thus without having to interrupt the printing process. The ink reservoir is at kept at ambient pressure to allow for a convenient refill. Optionally, an anti-return valve is placed between the ink reservoir and the ink chamber to prevent ink from flowing back to the reservoir when the pump is idle.

The invention is also about a printing unit integrating the dispensing system that controls the ink composition. The dispensing system is well adapted for a printing unit type that uses a fixed cliché, i.e. a gravure, flexographic or offset printing unit, each unit printing a single colour channel. An optical sensor is used at the output of the unit to measure an optical parameter on the printed medium (for example the optical density, the brightness or the spectrum of a colour patch). When the measurement does not match a specified value, the control system changes the relative mixture of ink to reach or approach the specified value. Please note that the (absolute) composition of the ink in each channel does not need to be known. The absolute mixing proportion of the inks needs not to be known either. The dispensing system needs only to be able to vary (and to keep stable) the relative proportion of the ink stemming from each chamber, and vary (and to keep stable) the total flow of ink.

The invention is about dispensing precise amounts of ink, optionally with an adjustable composition when using two or more ink chambers. It is particularly well suited for inking systems with a very small ink buffer between the output of the dispensing system and the printed medium. In particular, in said inking system, there is no recirculation of ink between the ink buffer and the ink chamber. In particular, there is no return channel from the ink buffer to the ink chamber or to the ink refill reservoir.

A BRIEF DESCRIPTION OF THE FIGURES

Embodiments of the present invention are illustrated by way of example in the accompanying drawings in which reference numbers indicate the same or similar elements and in which.

A DETAILED DESCRIPTION OF THE INVENTION AND OF SOME OF ITS EMBODIMENTS

Figure 1A:
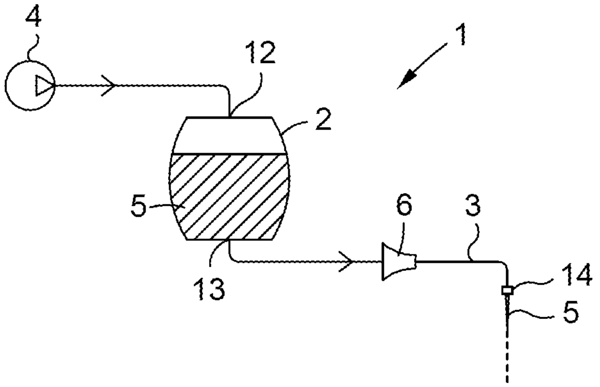
FIG. 1A shows an example of an ink dispensing system with a chamber, a pressure source and a sensor.
Figure 1B:
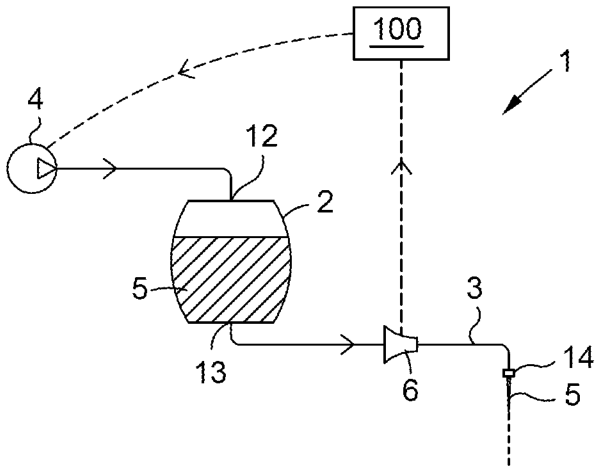
FIG. 1B shows the example of FIG. 1A picturing the feedback loop to control the pressure of the pump based on the flow sensor reading.

FIGS. 1A and 1B show an example of ink dispensing system 1 that uses a (first) chamber 2 connected to a (first) pressure source 4. The pressure source generates a controllable pressure in the chamber 2 causing the ink 5 to be pushed through the ink outlet 13 into the (first) ink channel 3. A (first) sensor 6 measures the flow of ink travelling through the channel 3 toward the dispensing unit output 14. The flow of ink is controlled by varying the pressure delivered to the chamber 2, for example by acting on the amount and/or pressure of air delivered by the pressure source 4. This solution allows for a precise and continuous ink dispensing.

Please note that any pressure source disclosed and claimed in this document may be a source of pressurised air with constant pressure connected to controllable air valve (for example a proportional valve), or may be a pump. The controllable air valve delivers a (settable) fraction of the pressure present in the source of pressurised air. Also, when mentioning two pressure sources, it may refer to a single source of pressurised air with two controllable air valves.

The pressure sources 4,24 in this document deliver air under pressure. By air we mean any gas—but preferably air—that does not interfere with the ink quality (it could be CO2).

The chambers inlet 12 and outlet 13 (of any exemplary chamber in this document) are preferably positioned and configured such that the air entering the chamber pushes the ink through the outlet 13, without creating bubbles or any other artefacts. Advantageously, the outlet is positioned such that the chamber can be emptied by the air under pressure. For example, to achieve this characteristic, the inlet 12 may be positioned on the top of the chamber 2 and the outlet on the bottom of the chamber 2.

Figure 2:
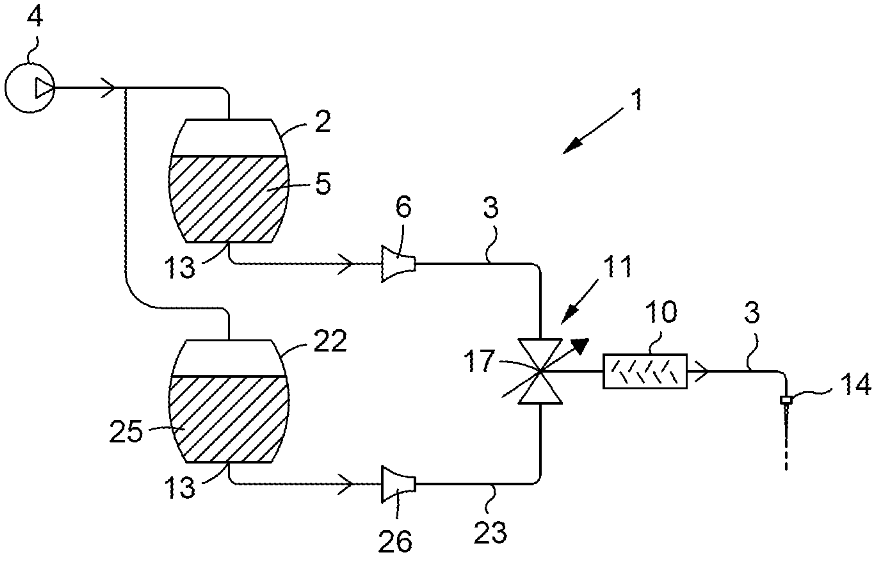
FIG. 2 shows an example of a dispensing system for controlling the ink composition, composed of one source of pressure, two chambers and a mixer with a mixing valve.

FIG. 2 shows an example of a dispensing system configured to regulate the composition of the ink at the output 14. It is made of two chambers 2,22 connected to the same source of pressure 4. Each chamber is connected to its respective ink channel 3,23 that transports the ink to the dispensing output 14. An ink mixer 10 is placed on the path of the ink channels, to mix the ink 5 coming from the first chamber 2 (i.e. from the first ink channel 3) with the ink 25 coming from the second chamber 22 (i.e. from the second ink channel 23) together. The mixer 10 is configured to deliver a homogeneous mixture of ink. To control the ink composition, the mixer 10 comprises—or is connected to—a mixing valve 11, whose function is to control the relative amounts of ink extracted from each channel 3,23. Advantageously, the mixer may be able to set any ink ratio at the mixer output, from an ink composition made of 100% of ink 5 stemming from chamber 2 to a composition made of 100% of ink 25 stemming from chamber 22. A second sensor 26 is placed on the second ink channel 23 to measure the flow of ink coming out of the second chamber 22. The first sensor 6 is placed upstream from the mixer on the first ink channel 3 to measure the flow of ink coming out of the first chamber 2. As an alternative, the first sensor 6 may be placed downstream from the mixer 10, thereby measuring the total flow of ink delivered by the dispensing system 1. A control system is connected to the two sensors 6,26, to the mixing valve 11 and to the pressure source for controlling the amount and composition of ink dispensed by the system (the pressure source influences the total flow of ink, while the mixer influences the ink composition).

Please note that to obtain a reactive system, the path length between the junction point 17 of the ink channels and the output of the dispensing system should be kept as short as possible. Thus, the output of the dispensing system may be the output of the mixer. Also, the mixer can be a passive device, or an active one where an element (for example a rotating helix, a rotating element or an oscillating body) actioned by a motor mixes the ink inside the mixer.

The first and second chambers are supposed to be filled with inks having different characteristics for regulating the ink composition. For example, the first chamber 2 may be filled with ink having a pigment concentration below specification, while the second chamber 22 may be filled with ink having a pigment concentration above specification. By controlling the ink proportion (for example by acting on the mixing valve 11), the system 1 can dispense ink with an adjustable density. This adjustment capability allows the ink dispensing system 1 to compensate for printing instabilities caused by environmental parameters, like temperature or humidity, or due to the wearing of the printing hardware. To do that, the printing machine (or printing unit) that integrates the dispensing system must have a sensor that monitors the quality of the print and feeds back the measurement. The measurement is compared to the desired value to adjust the composition and/or the amount of the dispensed ink.

Figure 3:
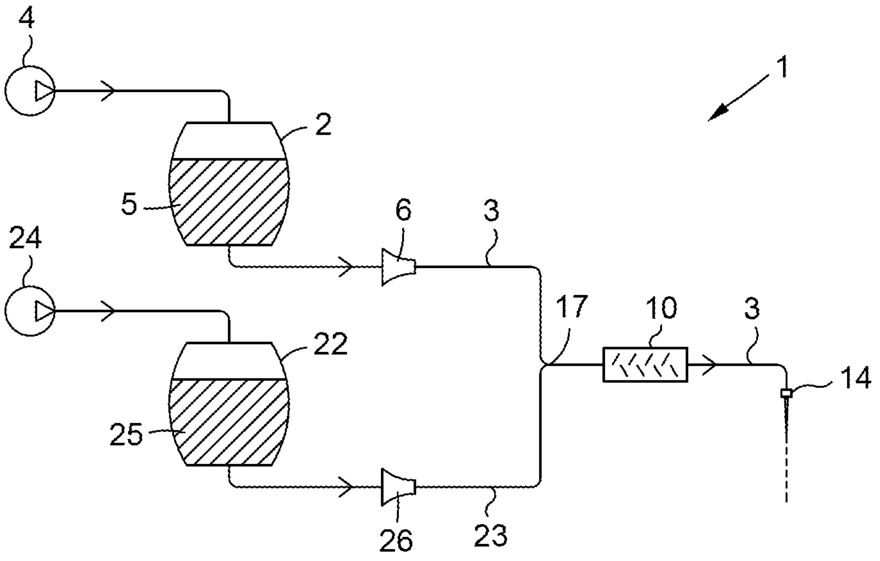
FIG. 3 shows a variation of the example in FIG. 2 where the mixing valve is replaced by using two pressure sources.

FIG. 3 shows an example where, compared to FIG. 2, the ink composition is controlled by using an additional pressure source 24 instead of the mixing valve 11. Thus, the first pressure source 4 is connected to the first chamber 2, while the second pressure source 24 is connected to the second chamber 22. The amount and composition of ink dispensed by the system are controlled by individually controlling the pressure delivered by each of the two pressure sources 4,24. As an alternative, the flow sensors 6,26 may be replaced by a single flow sensor 6 on the ink channel 3 downstream from the mixing valve.

Figure 4:
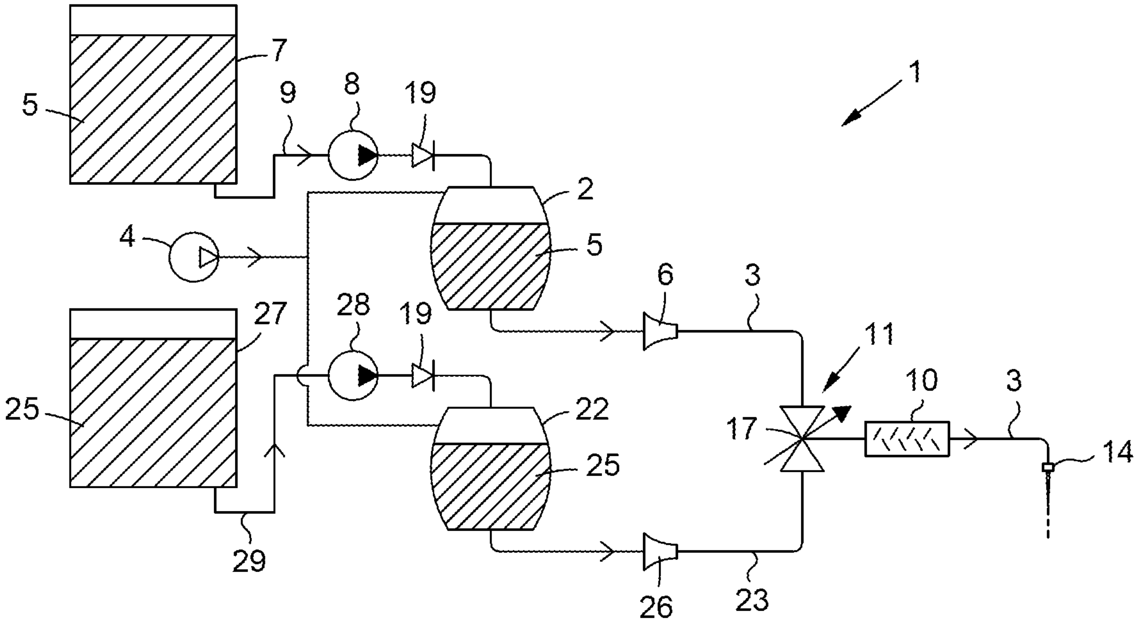
FIG. 4 shows the example of FIG. 2 where a refill reservoir is connected to every chamber.

FIG. 4 shows the example of FIG. 2 by adding a refill system. Thanks to the refill system, the dispensing system can function non-stop. A first ink reservoir 7 is connected to the first chamber 2 through a refill channel 9. The ink reservoir is advantageously kept at ambient pressure, thus allowing for a simple refill method. A refill pressure source 8 on the refill channel is used to push the ink from the reservoir 7 to the chamber 2. The refill pressure source 8 compensates for the difference in pressure between the reservoir 7 and the chamber 2. Please note that a reservoir (7,27) like the ones in FIG. 4 (and the related refill channel and pressure source) can be added to any chamber of this document to (re)fill the chamber with ink. Here, a second reservoir 27 is connected to the second chamber 22 through a second refill channel 29 with a refill pump 28. The refill pump can be, for example, a diaphragm pump, a gear pump, a peristaltic pump or a piston. Preferably, an anti-return valve 19 is placed on the refill channel (9,29) to prevent the depressurisation of the chamber and/or to prevent ink from flowing back to the reservoir from the chamber. The anti-return valve is particularly useful in embodiments where the pressure source 8 is integrated with the reservoir into a single device, to prevent the depressurisation of the chamber when switching a reservoir with new one during printing. Please note that there is no need to switch reservoirs; a reservoir might be refilled during printing; the anti-return valve 19 gives more flexibility in the use of the ink dispensing system 1 and in the choice of the type of pressure source 8.

Figure 5:
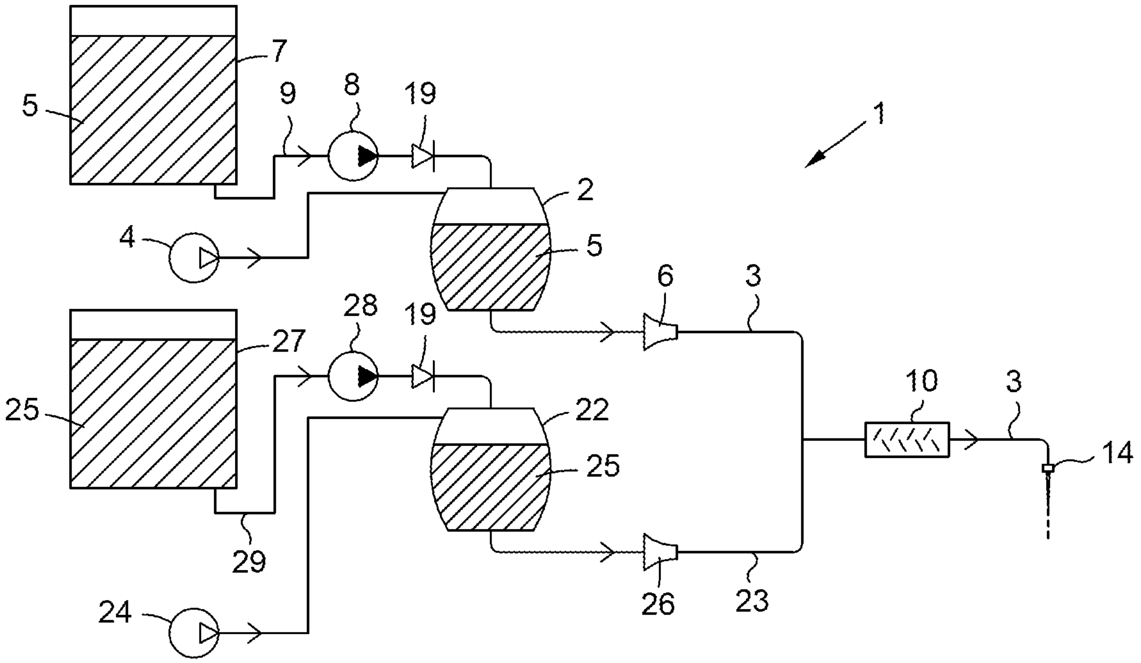
FIG. 5 shows the example of FIG. 3 where a refill reservoir is connected to every chamber.

FIG. 5 shows an example where, compared to FIG. 4, the ink composition is controlled by using an additional pressure source 24 instead of the mixing valve 11. In this example, the flow sensor 26 is not optional.

Figure 6:
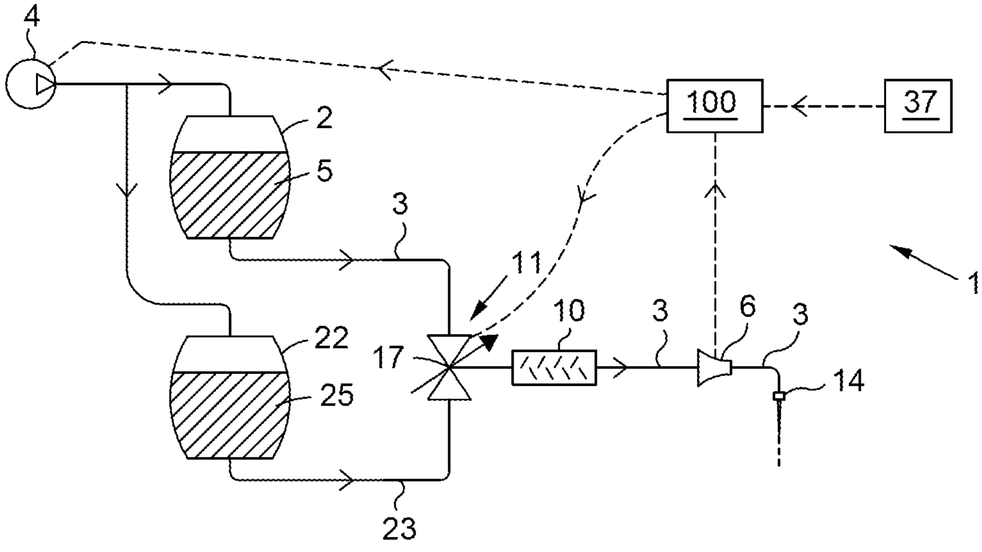
FIG. 6 shows the example of FIG. 2 where only one sensor is used.

FIG. 6 shows a modification of the example of FIG. 2, by using only one sensor. The dispensing system of FIG. 6 is adapted for a printing machine having an optical sensor 37 that monitors the quality of the printed medium 34 (not shown). Sensor 6 measures the total flow of ink dispensed by the unit. This measurement is used to make sure that there is neither too much nor too little ink in the inking system of the printing unit. Also, the feedback of the optical sensor 37 of the printing machine or printing unit (or in general the feedback of the quality control system) is used to set or correct the ink mixing proportion by acting on the mixing valve 11.

Figure 7:
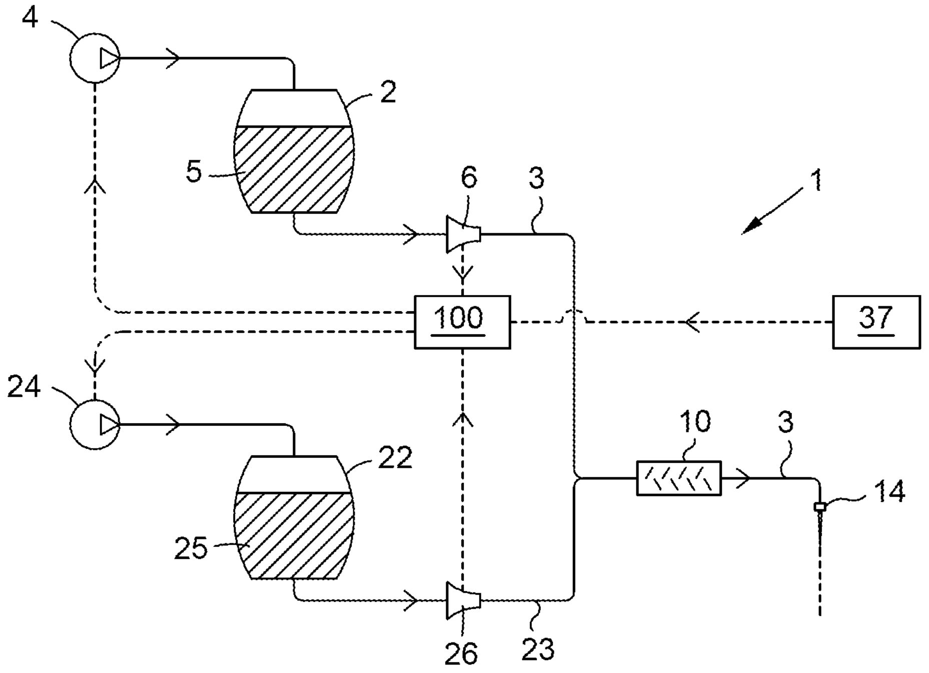
FIG. 7 shows the example of FIG. 3 depicting the control system.

FIG. 7 shows the example of FIG. 5 showing the control system 100. The dispensing system of FIG. 7 is adapted for a printing machine having an optical sensor 37 that monitors the quality of the printed medium 34 (not shown). The flow sensors 6,26 measures the flow of ink dispensed by each ink chamber 2,22. Also, the feedback of the optical sensor 37 of the printing machine or printing unit (or in general the feedback of the quality control system) is used to set or correct the ink mixing proportion and amount by acting on the relative and total pressure of the pressure sources 2, 24, respectively, and monitoring the resulting ink flow using the flow sensors 6, 26.

Figure 8:
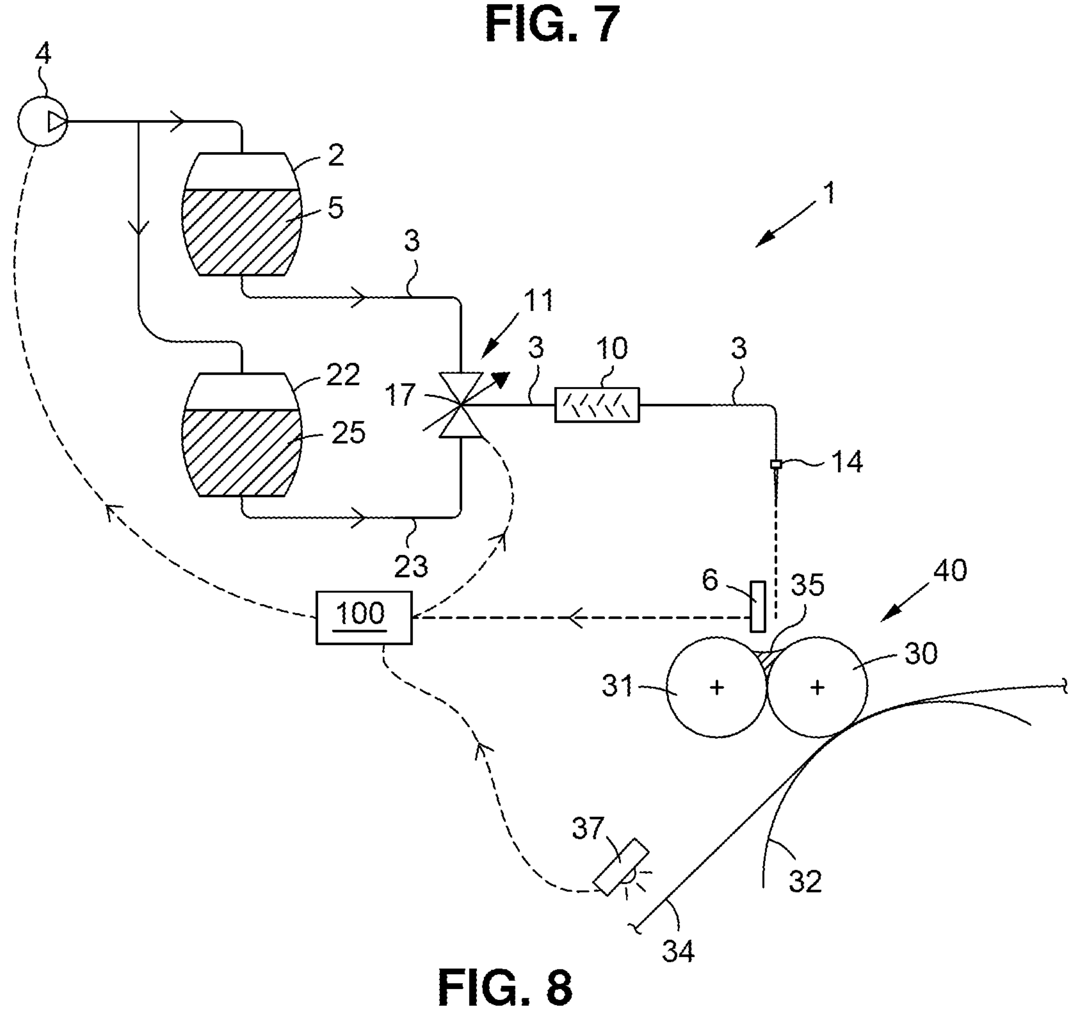
FIG. 8 shows the example of FIG. 6 where the sensor is replaced by a sensor which monitors the level of ink in an ink buffer.

FIG. 8 shows a modification of the example of FIG. 6, where the sensor 6 is replaced by a level sensor that measures the level of ink present in the ink buffer 35 of the inking system of the printing unit. According to a preferred embodiment, the inking buffer is implemented by exploiting the area above the nip between an inking cylinder 31 and an etched cylinder 30 (anilox or gravure cylinder or plate cylinder) of the printing unit. Nevertheless, it could be implemented using an ink pan, or a chamber with a double doctor blade. The level sensor is used to control the amount of ink that the dispensing system 1 needs to deliver over time. A printing unit has an optical sensor 37 that monitors the quality of the print on the substrate 34 and feeds back the measurement. The measurement is compared to the desired value to adjust the composition of the dispensed ink (i.e., adjust the mixing valve setting). Please note that the part of FIG. 8 showing the printing rollers is approximate: the number of cylinders between the etched cylinder 30 and the impression cylinder 32 may vary depending on the type of printing technology (here a gravure technology is pictured).

Figure 9:
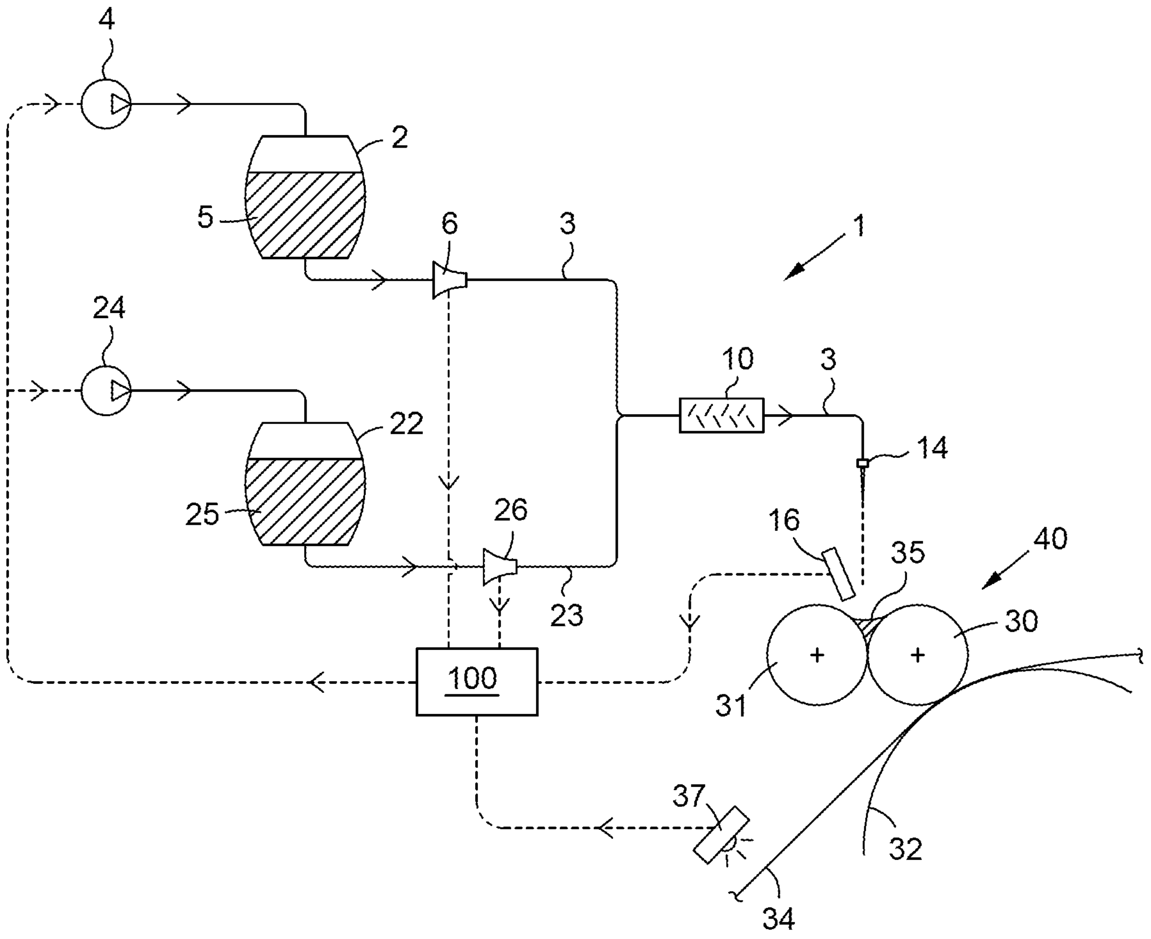
FIG. 9 shows the example of FIG. 7 using an additional sensor to monitor the level of ink in an ink buffer.

FIG. 9 shows an embodiment according to the example of FIG. 7, where a level sensor measures the level of ink present in the ink buffer 35 of the inking system of the printing unit. As in the example of FIG. 8, the inking buffer is implemented by exploiting the area above the nip between an inking cylinder 31 and an etched cylinder 30 (anilox or gravure cylinder or plate cylinder) of the printing unit. Nevertheless, it could be implemented using an ink pan, or a chamber with a double doctor blade. The level sensor is used to make sure that there is enough ink in the ink buffer. A printing unit has an optical sensor 37 that monitors the quality of the print on the substrate 34 and feeds back the measurement. The measurement is compared to the desired value to adjust the composition of the dispensed ink (i.e. adjust the relative pressure of the sources of pressure 4,24). Please note that the part of FIG. 9 showing the printing rollers is approximate: the number of cylinders between the etched cylinder 30 and the impression cylinder 32 may vary depending on the type of printing technology (here a gravure technology is pictured).

The control system used to control any embodiments of the invention takes as input the reading of the sensors and a piece of information from the quality control system of the printing machine/unit. Said piece of information can be the measurement of an optical sensor that reads the printed substrate (along with its desired value), or a more abstract piece of information instructing the system to change the ink characteristics in a certain way, or to augment or reduce the ink flow dispensed by the system 1. The control system outputs control signals to the pressure sources 4,24 and/or to the mixing valve, thereby controlling the total amount of ink dispensed by the system 1 and, if applicable, the composition of the ink dispensed.

The examples that are suited for controlling the ink composition in this document can be extended to embodiments using any number of chambers (greater than two). This would allow controlling more than one parameter of the ink composition, for example by affecting the hue and the density of the dispensed ink.

Please note that when this document mentions an example of a dispensing system, it means an exemplary embodiment of a dispensing system according to the invention.

Please note that to regulate the composition of ink to obtain a target value, it is sufficient to be able to modify the relative amount of ink in the ink mixture without measuring the absolute values. For example, the system does not need to know that the ink mixture of the example in FIG. 2 is made of 57% of ink 5 and 43% of ink 25, but only needs to be able to change this ratio and be able to keep the ratio constant.

Please note that the first ink channel 3 connects the output of the chamber 2 to the output of the dispensing system 14, while the second ink channel 23 connects the output of chamber 22 to the junction 17. Thus, after the junction 17, the first ink channel 3 may contain ink from several ink chambers.

The output 14 of the dispensing system may be a single output, as depicted in the Figures, or it might be multiple: a set of connections, preferably having the same length, may connect the output of the mixer to several outputs 14 of the dispensing system. In this way, the dispensed ink can be distributed over a larger area or along a line.

In practice, the pressure used in the chambers ranges typically between 1 and 2 bars, for example, 1.5 bar. They could, however, range from 0.1 to 3 bars.

Please note that pressure is used to push the ink out of the system 1. The dispensing system is usually dispensing ink continuously, but may also be stopped and restarted when needed. Given the volumes of air/ink under pressure involved in the system, the frequency of this stop and restart process is several orders of magnitude slower than the ones used in ink jet printing, where the ink dispensed is used to create a pattern.

The volume of the chamber 2,22 is dimensioned so that, when using the printing unit at full speed, full width and at 100% ink coverage, the chamber is designed to consume its ink content in 5 to 10 minutes. This is the time needed for an operator to switch an empty ink reservoir 7,27 with a new—full—one without interrupting the printing process. In our implementation, a chamber 2,22 contains three litres of ink. Alternatively, the chamber 2,22 may contain between two and five litres of ink. In any case, the capacity of an ink chamber is larger than 0.1 litres. Please note that instead of switching a reservoir 7,27 with a new, full one, the operator may simply refill the reservoir with new ink.

By fixed cliché, we mean a picture that is the same for the whole duration of the printing job (in contrast to digital printing where the pictures may change from page to page).

Please note that when the dispensing system is running, the ink follows a path from upstream to downstream.

The invention claimed is:

1. An ink dispensing system comprising a first chamber configured to hold a first ink under pressure;

a first ink channel connecting an output of the first chamber to a first input of a mixing valve, the first ink channel capable of providing the first ink to the mixing valve from only the first chamber;

a first pressure source configured to deliver air with adjustable pressure to the first chamber;

a first sensor configured to measure an amount or a flow of the first ink; and a control system functionally connected to the first pressure source and to the first sensor, wherein the control system is configured to (1) control the amount of an output ink output by the ink dispensing system by adjusting a pressure value of the first pressure source to a first pressure configured to flow the first ink and a second pressure configured to flow the first ink, and (2) control a composition of the output ink by adjusting the mixing valve to control the amount of the first ink extracted from the first ink channel relative to the amount of a second ink separately input to the mixing valve.

2. The ink dispensing system according to claim 1, further comprising a second chamber configured to hold the second ink under pressure;

a second ink channel connecting an output of the second chamber to a second input of the mixing valve at a junction joining the second ink channel with the first ink channel, the second ink channel capable of providing the second ink to the mixing valve from only the second chamber; and an active mixer located at the junction or downstream from the junction according to the flow of the first ink on the first ink channel and configured to mix the first ink and the second ink together and to output the output ink that is a resulting mixture to the output of the ink dispensing system.

3. The ink dispensing system according to claim 2, further comprising a second sensor configured to measure the flow of the second ink stemming from the second chamber or configured to measure the amount of the second ink inside the second chamber;

a second pressure source configured to deliver air with adjustable pressure to the second chamber, wherein the control system is configured to control the flow of the second ink stemming from the second chamber by adjusting a pressure value delivered by the second pressure source thereby controlling a total amount of the output ink delivered by the ink dispensing system as well as a relative amount of both the first ink and the second ink stemming from each chamber.

4. The ink dispensing system according to claim 2, further comprising the mixing valve at the junction controls a relative amount of the first ink and the second ink stemming from the first chamber and from the second chamber, respectively, and wherein the first pressure source is connected to the first chamber and to the second chamber to deliver air to both chambers with adjustable pressure.

5. The ink dispensing system according to claim 2, further comprising a first ink reservoir configured to deliver the first ink to the first chamber; and a second ink reservoir configured to deliver the second ink to the second chamber.

6. An ink dispensing system according to claim 5, further comprising a second sensor configured to measure the flow of the second ink stemming from the second chamber or configured to measure the amount of the second ink inside the second chamber;

a second pressure source configured to deliver air with adjustable pressure to the second chamber, wherein the control system is configured to control the flow of the second ink stemming from the second chamber by adjusting a pressure value delivered by the second pressure source thereby controlling a total amount of the output ink delivered by the ink dispensing system as well as a relative amount of the first ink and the second ink stemming from each chamber.

7. The ink dispensing system of claim 2, wherein the active mixer is a rotating helix mixer, a rotating element mixer, or an oscillating body mixer, and the output of the mixer is the output of the ink dispensing system.

8. The ink dispensing system according to claim 1, further comprising a first ink reservoir configured to deliver the first ink to the first chamber.

9. A rotary printing unit, comprising an ink dispensing system according to claim 4;

a subsystem comprising a set of cylinders and an ink buffer configured to print a single color channel of a fixed cliché and a control mark on a medium;

an optical sensor configured to measure an optical parameter from the printed control mark on the medium and connected to the control system, wherein the ink dispensing system is configured to provide the subsystem with the output ink, and the control system is functionally connected to the optical sensor and is configured to vary the relative amount of the first ink stemming from the first chamber and the second ink stemming from the second chamber whenever the measured optical parameter deviates from a target value to match the measured optical parameter with the target value.

10. The rotary printing unit according to claim 9, wherein there is no ink recirculation channel from the ink buffer to the ink dispensing system configured for transporting ink from an ink reservoir to the ink dispensing system.

11. An ink dispensing system comprising:

a first chamber configured to hold a first ink under pressure;

a mixing valve having a first input and a second input;

a first ink channel connecting an output of the first chamber to the first input to provide the first ink to the first input from only the first chamber;

a first pressure source configured to deliver air with adjustable pressure to the first chamber;

a first flow sensor configured to measure a flow of the first ink, the first flow sensor positioned downstream of the first chamber; and a control system functionally connected to the first pressure source, the mixing valve, and the first sensor, wherein the control system is configured to (1) control an amount of an output ink output by the ink dispensing system by adjusting a pressure value to a first pressure sufficient to cause the first to flower and a second pressure sufficient to cause the first ink to flow, and (2) control a composition of the output ink output by the ink dispensing system by adjusting the mixing valve to control the amount of the first ink extracted from the first ink channel relative to the amount of a second ink separately input to the mixing valve.

12. The ink dispensing system of claim 11, further comprising:

a second chamber configured to hold the second ink under pressure;

a second ink channel connecting an output of the second chamber to the second input of the mixing valve;

an active mixer located at the mixing valve or downstream from the mixing valve according to the flow of the first ink on the first ink channel and configured to mix the first ink and the second ink together and to output the output ink that is a resulting mixture to the output of the ink dispensing system.

13. The ink dispensing system of claim 12, further comprising:

the mixing valve is at a junction and controls a relative amount of the first ink and the second ink stemming from the first chamber and from the second chamber, respectively, and wherein the first pressure source is connected to the first chamber and to the second chamber to deliver air to both chambers with adjustable pressure.

14. The ink dispensing system according to claim 12, further comprising:

a first ink reservoir configured to deliver the first ink to the first chamber; and a second ink reservoir configured to deliver the second ink to the second chamber.

15. The ink dispensing system of claim 14, further comprising:

the mixing valve controls a relative amount of the first ink and the second ink stemming from the first chamber and from the second chamber, respectively, wherein the first pressure source is connected to the first chamber and to the second chamber to deliver air to both chambers with adjustable pressure.

16. An ink dispensing system comprising:

a first chamber configured to hold a first ink under pressure;

a second chamber configured to hold a second ink under pressure;

a mixing valve at a junction;

a first ink channel connecting an output of the first chamber to a first input of the mixing valve at the junction, and a second ink channel connecting an output of the second chamber to a second input of the mixing valve at the junction, so that the mixing valve receives only the first ink at the first input and only the second ink at the second input;

a first pressure source configured to deliver a gas with adjustable pressure to the first chamber and the second chamber;

a first sensor configured to measure an amount or a flow of the first ink;

a second sensor configured to measure an amount or a flow of the second ink; and a control system functionally connected to the first pressure source, the first sensor, the second sensor, and the mixing valve, wherein the control system is configured to control a composition of combined ink output by the ink dispensing system by adjusting the mixing valve to control the amount of the first ink relative to the amount of the second ink extracted from the first ink channel and the second ink channel, respectively.

17. The ink dispensing system of claim 16, further comprising:

a second pressure source configured to deliver a second gas with adjustable pressure to the second chamber.

18. The ink dispensing system of claim 16, wherein the control system is configured to control the amount of combined ink output by the ink dispensing system by adjusting a pressure value of the gas to a first gas pressure configured to flow the first ink and the second ink and a second gas pressure configured to flow the first ink and the second ink.

19. The ink dispensing system of claim 16, further comprising an active mixer that is a rotating helix mixer, a rotating element mixer, or an oscillating body mixer.

20. The ink dispensing system of claim 19, wherein the control system is capable of adjusting the mixing valve to control the amount of the first ink relative to the amount of the second ink extracted from the first ink channel and the second ink channel, respectively, such that the combined ink output from the mixing valve is solely from one of the first chamber or the second chamber.

* * * * *